(12) United States Patent
Cromer

(10) Patent No.: US 6,547,257 B2
(45) Date of Patent: Apr. 15, 2003

(54) COMBINATION TRANSITION PIECE FLOATING CLOTH SEAL AND STAGE 1 TURBINE NOZZLE FLEXIBLE SEALING ELEMENT

(75) Inventor: Robert Harold Cromer, Johnstown, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/848,617

(22) Filed: May 4, 2001

(65) Prior Publication Data

US 2002/0163134 A1 Nov. 7, 2002

(51) Int. Cl.[7] .............. F16J 15/02; F16J 15/44; F04D 29/08; F04D 29/10; F01D 25/00
(52) U.S. Cl. .............. 277/630; 277/637; 277/626; 277/355; 415/135; 415/173.3; 415/174.2; 415/230; 415/231
(58) Field of Search ................ 277/355, 628, 277/630, 634, 637, 649, 650, 652, 653, 654, 626, 627; 415/174.2, 173.3, 174.4, 134, 135, 139, 229, 230, 231

(56) References Cited

U.S. PATENT DOCUMENTS

| | | | | |
|---|---|---|---|---|
| 3,869,222 A | * | 3/1975 | Rahnke et al. | 415/134 |
| 4,138,032 A | * | 2/1979 | McCabe | 220/224 |
| 4,325,411 A | * | 4/1982 | Squirrell | 137/599.16 |
| 4,465,284 A | | 8/1984 | Szema | |
| 4,626,002 A | * | 12/1986 | Hagemeister et al. | 277/610 |
| 4,645,217 A | * | 2/1987 | Honeycutt et al. | 277/555 |
| 5,118,120 A | * | 6/1992 | Drerup et al. | 277/628 |
| 5,125,796 A | | 6/1992 | Cromer | |
| 5,145,316 A | * | 9/1992 | Birch | 415/173.1 |
| 5,188,507 A | * | 2/1993 | Sweeney | 415/170.1 |
| 5,265,412 A | | 11/1993 | Bagepalli et al. | |
| 5,400,586 A | | 3/1995 | Bagepalli et al. | |
| 5,657,998 A | * | 8/1997 | Dinc et al. | 277/653 |
| 5,749,218 A | * | 5/1998 | Cromer et al. | 60/39.37 |
| 6,010,132 A | | 1/2000 | Bagepalli et al. | |
| 6,042,119 A | | 3/2000 | Bagepalli et al. | |
| 6,173,958 B1 | | 1/2001 | Dinc et al. | |

* cited by examiner

Primary Examiner—Anthony Knight
Assistant Examiner—Vishal Patel
(74) Attorney, Agent, or Firm—Nixon & Vanderhye P.C.

(57) ABSTRACT

A transition piece seal assembly includes a transition piece seal support having a first flange for supporting a transition piece seal, and a second flange adapted for mounting in an adjacent nozzle; and at least one spring seal element having a mounting flange adapted to engage the second flange of the transition piece seal support, and a flex portion having a free edge adapted to engage a forward face of the nozzle.

19 Claims, 4 Drawing Sheets

COMBINATION TRANSITION PIECE FLOATING CLOTH SEAL AND STAGE 1 TURBINE NOZZLE FLEXIBLE SEALING ELEMENT

This invention relates to seals for turbine applications and particularly to seals between combustor transition pieces and stage one turbine nozzles.

BACKGROUND OF THE INVENTION

Sealing is oftentimes essential in rotary machines, especially when there are two relatively movable mechanical members in close proximity to one another. For example, sealing is required to prevent or at least minimize leakage of combustion gases at the interface between combustor transition pieces and stage one nozzles of gas turbines.

In can-annular combustor arrangements typically found in gas turbines manufactured by the assignee, a plurality of combustors are disposed in an annular array about the axis of the turbine. Hot combustion gases flow from each combustor through a respective transition piece into the first stage nozzle. In addition to relative movement (due, e.g., to dynamic pulsing) between these components, the transition pieces and first stage nozzle are formed of different materials and are thus subjected to different temperatures during operation, thereby experiencing different degrees of thermal growth. Thus, both the transition pieces and the first stage nozzle and/or nozzle support elements may move radially, circumferentially and axially relative to one another. This "mismatch" at the interface of the transition pieces and the first stage nozzle and/or nozzle support elements requires an effective seal to contain the combustion products and the pressure differential across that interface, and to prevent compressor discharge air from bypassing the combustor.

It is known to employ a dual stiffness cloth brush seal for sealing between combustor transition pieces and first stage nozzles or nozzle supports. Specifically, the layers of cloth material are disposed in a frame and suitably secured thereto, for example, by clamping to the frame, welding the material to the frame, or the like. The free edge of the layers are engaged within a U-shaped channel extending about the periphery of the downstream end of each transition piece, while a seal support is mounted within a groove or slot formed in the first stage nozzle or nozzle support. A cloth brush seal of this type is disclosed in commonly owned U.S. Pat. No. 6,042,119. This seal is not completely effective, however. For example, the inner and outer side walls of the stage one nozzle are unevenly heated, due to varied velocities on the pressure and suction sides of the nozzle. This causes the groove or slot where the seal support is secured to unevenly distort. This distortion, in effect, lifts the transition piece seal off its pressure sealing surface in the groove or slot, causing compressor discharge air to bypass the combustor, thereby increasing the levels of NOx emitted to atmosphere.

BRIEF SUMMARY OF THE INVENTION

This invention seeks to minimize leakage by combining the transition piece seal with flexible spring seal elements that provide better leakage control at the interface of the transition piece and the stage one nozzle or nozzle support. For purposes of this disclosure, it matters not whether the spring seal element engages the nozzle itself or a nozzle support element. Thus, reference will be made herein simply to the first stage nozzle.

Specifically, each flexible spring seal element includes a generally horizontal mounting flange that enables the spring seal element to be secured within the slot formed in the first stage nozzle, along with the transition piece seal support. The remainder of the spring seal element has a sideways S or Z shape, with a flexible free end of the seal element adapted to engage the forward face of the first stage nozzle. The spring seal element is formed with a plurality of laterally spaced, axially oriented slots extending from the free sealing edge substantially to the horizontal mounting flange so that the spring seal element can differentially adapt or conform to the forward face of the first stage nozzle. To prevent leakage through the slots, a second substantially identical spring seal element is layered over the first spring seal element, but laterally offset in a shingled arrangement, thereby closing the slots in the respective spring elements. When the spring seal elements are mounted in the groove or slot in the first stage nozzle, along with the transition piece seal support, the free ends of the spring seal elements are resiliently compressed or biased against the forward face of the stage one nozzle, creating a first sealing location. At the same time, axial compression of the sealing elements also results in a downward force on the mounting flange, pushing the transition piece seal support against the lower surface of the groove or slot in the first stage nozzle, creating a second seal location.

Accordingly, in its broader aspects, the present invention relates to a transition piece seal assembly comprising a transition piece seal support having a first flange for supporting a transition piece seal, and a second flange adapted for mounting in an adjacent nozzle; and at least one spring seal element having a mounting flange adapted to engage the second flange of the transition piece seal support, and a flex portion having a free edge adapted to engage a forward face of the nozzle.

In another aspect, the invention relates to a gas turbine comprising an annular array of combustors, each having a transition piece extending between the combustor and a first stage turbine nozzle, and wherein a transition piece seal assembly is interposed at the interface of each transition piece and the first stage turbine nozzle, each transition piece seal assembly comprising a transition piece seal support having a first flange for supporting a transition piece seal, and a second flange secured in the first stage turbine nozzle; and at least one spring seal element having a mounting flange seated on the second flange of the transition piece seal support, and a flex portion having a free edge compressively engaged with a forward face of the nozzle.

In still another aspect, the invention relates to a method of reducing leakage at an interface of a transition piece and a first stage turbine nozzle comprising: a) providing a seal assembly between the transition piece and the first stage turbine nozzle wherein the transition piece seal assembly is supported on a forward face of the first stage turbine nozzle and includes a seal support supporting sealing media engaged in a peripheral slot or channel on the transition piece; and b) providing at least one additional sealing element supported at one end in the forward face of the first stage turbine nozzle and having a free edge remote from the one end engaged with the forward face of the first stage turbine nozzle.

DETAILED DESCRIPTION OF THE INVENTION

Figure 1:
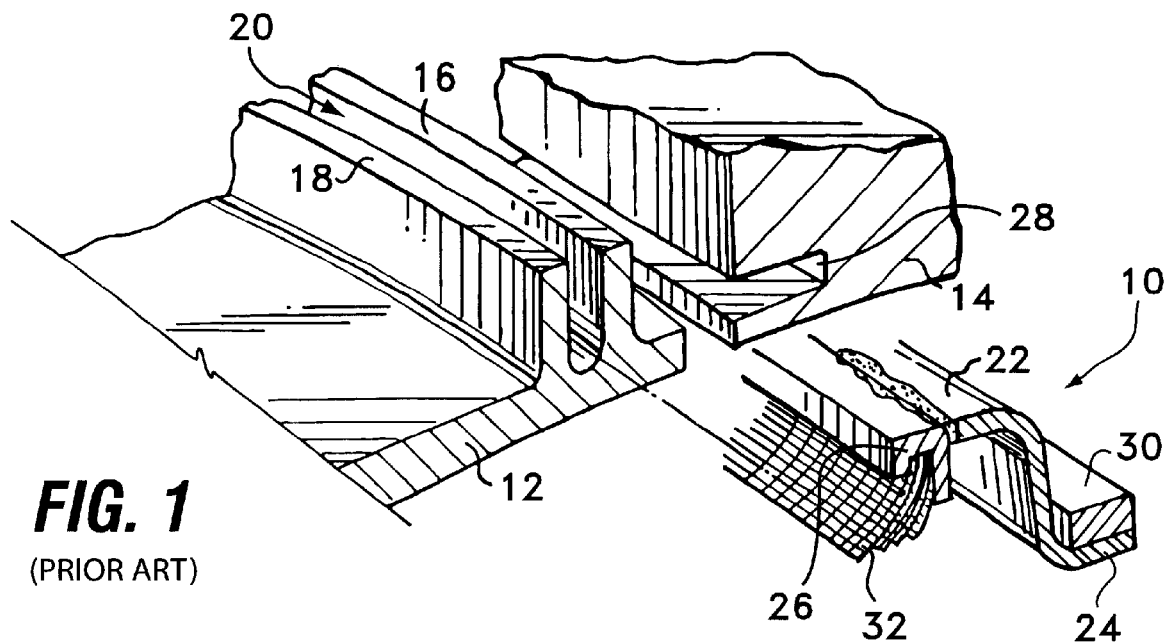
FIG. 1 is an enlarged fragmentary perspective view of a known transition piece cloth brush seal, employed between a transition piece and a first stage nozzle.
Figure 2:
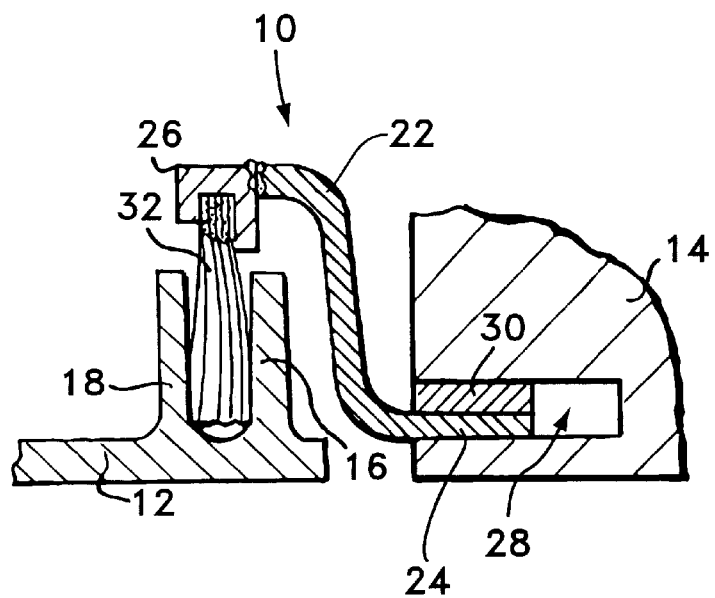
FIG. 2 is an enlarged fragmentary cross sectional view of the transition piece seal of FIG. 1.
Figure 3:
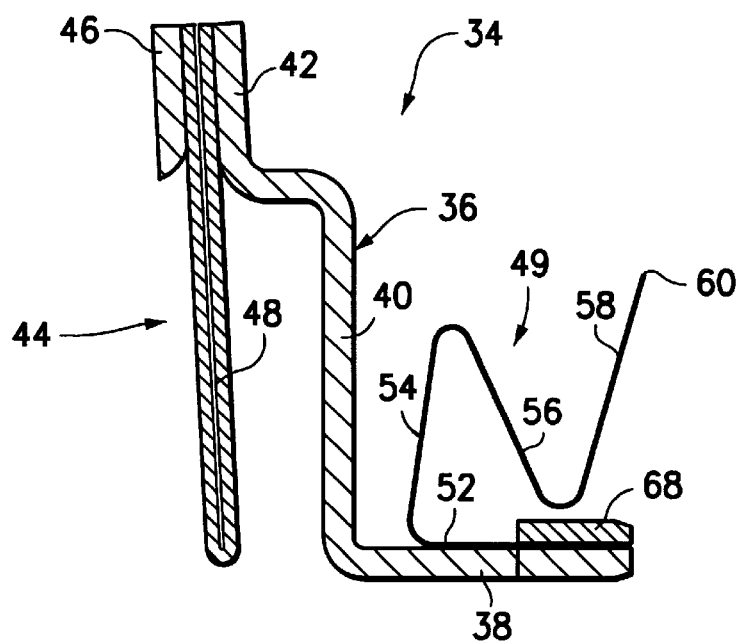
FIG. 3 is a cross sectional view of a combination transition piece seal and flexible spring seal element in accordance with this invention.

Referring to FIGS. 1 and 2, there is illustrated a known transition piece seal 10 interposed between a forward end of a transition piece 12 and a first stage nozzle 14. It will be appreciated that the transition piece 12 and the first stage nozzle or nozzle support 14 are movable radially, circumferentially and axially relative to one another due to vibratory or pulsing dynamics and also due to differential thermal growth.

The transition piece 12 includes an upstanding groove 20 or channel formed by a pair of flanges 16 and 18. The seal 10 includes a support 22 including a mounting flange 24 at one end, and an inverted J-shaped support channel 26 at an opposite end. The mounting flange 24 is secured within a groove or slot 28 in the first stage nozzle, with the aid of one or more shims 30. The brush or cloth seal surfaces per se of the seal 10 comprise multiple layers 32 of woven material superposed directly one over the other. Marginal edges of the layers are suitably secured within the channel 26, for example, by welding, clamping or the like. The layers 32 extend freely from the margin secured to the channel 26, into the peripheral slot 20. This seal may be of the type disclosed in commonly owned U.S. Pat. No. 6,042,119, but other transition piece seal arrangements may be utilized in conjunction with this invention.

Figure 4:
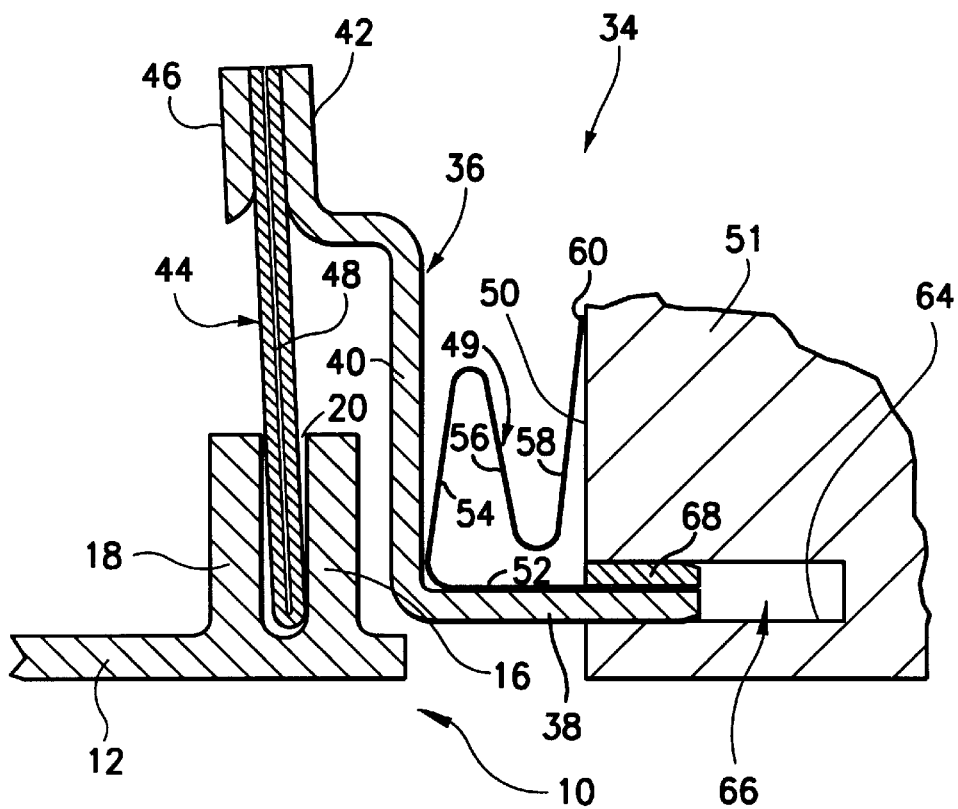
FIG. 4 is a cross sectional view of the transition piece seal and flexible spring seal element shown in FIG. 3, but mounted at the interface of a transition piece and first stage nozzle.
Figure 5:
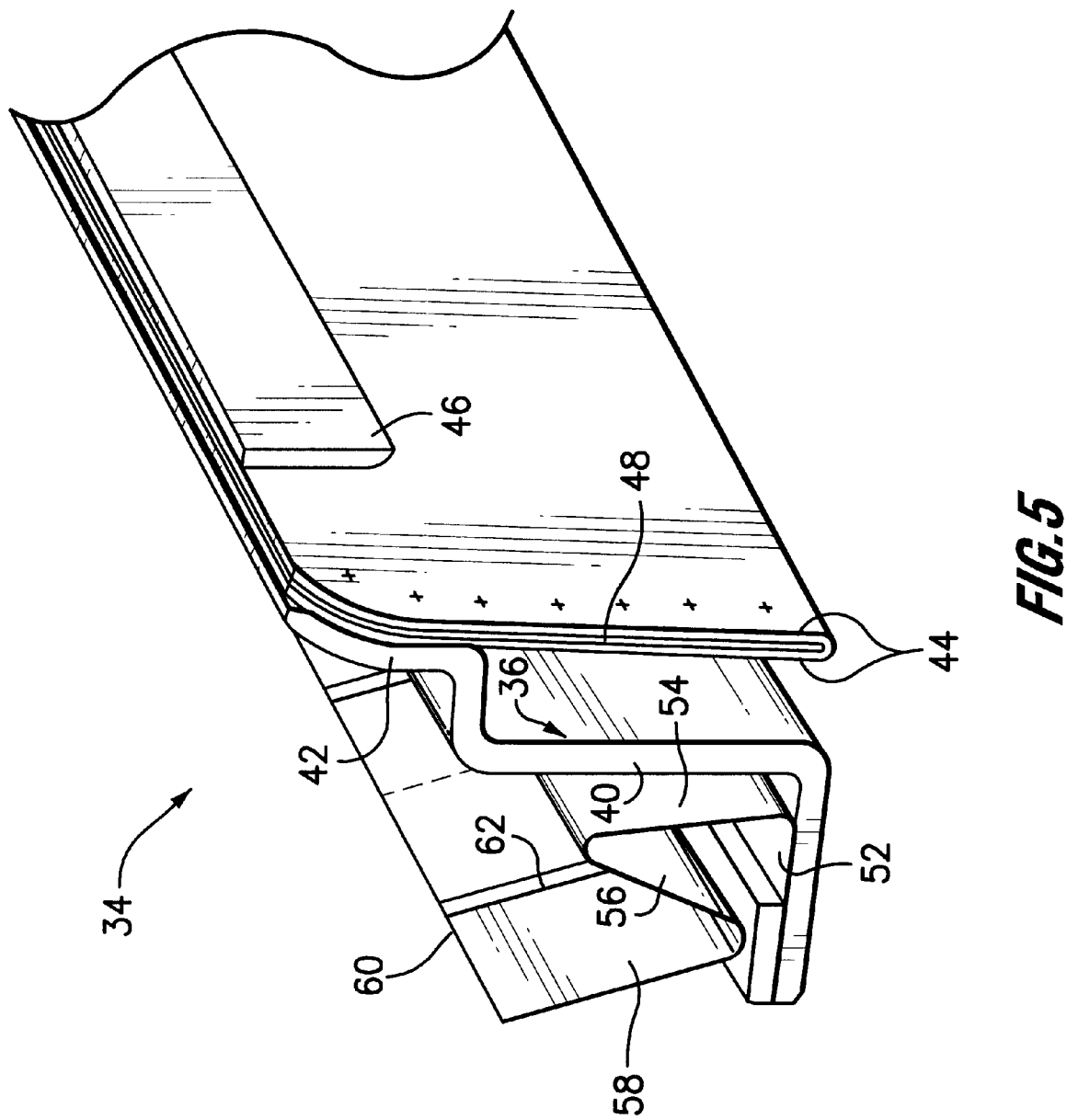
FIG. 5 is an enlarged fragmentary perspective view of the combined transition piece seal and flexible spring seal element shown in FIG. 3.

With reference now to FIGS. 3–7, the new transition piece seal 34 is generally similar to seal 10 and includes a seal support member 36 with a horizontal mounting flange 38, a vertical extension 40, and an offset, substantially vertical seal flange 42 that provides a support for sealing media, which, in the exemplary embodiment, comprises the cloth seal 44. The cloth seal 44 in the illustrated embodiment may be comprised of 0.027 inch thick Dutch twill weave, 30×250 mesh cloth of alloy L605. The cloth is wrapped about a pair of overlapped (in the lengthwise direction of the seal) shims 48 and pressed to flatten the woven mesh against the shims. The mesh layers are then spot welded to the shims along the side and top edges thereof as shown in FIG. 5. The seal is supported between seal flange 42 on one side, and an elongated backing bar 46 on the other, with the ends of the mesh cloth and shims clamped (or welded) therebetween.

In accordance with this invention, flexible spring sealing elements 49 are added to interface between the transition piece seal 34 and the vertical forward face 50 of the stage 1 nozzle 51.

Figure 6:
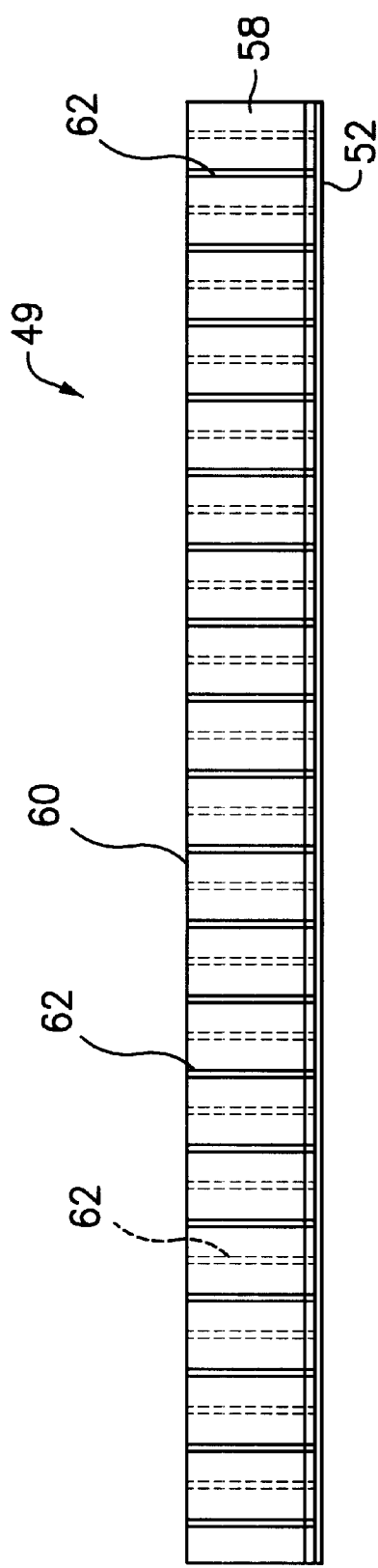
FIG. 6 is a rear elevation view of a pair of layered spring seal elements in accordance with the invention.
Figure 7:
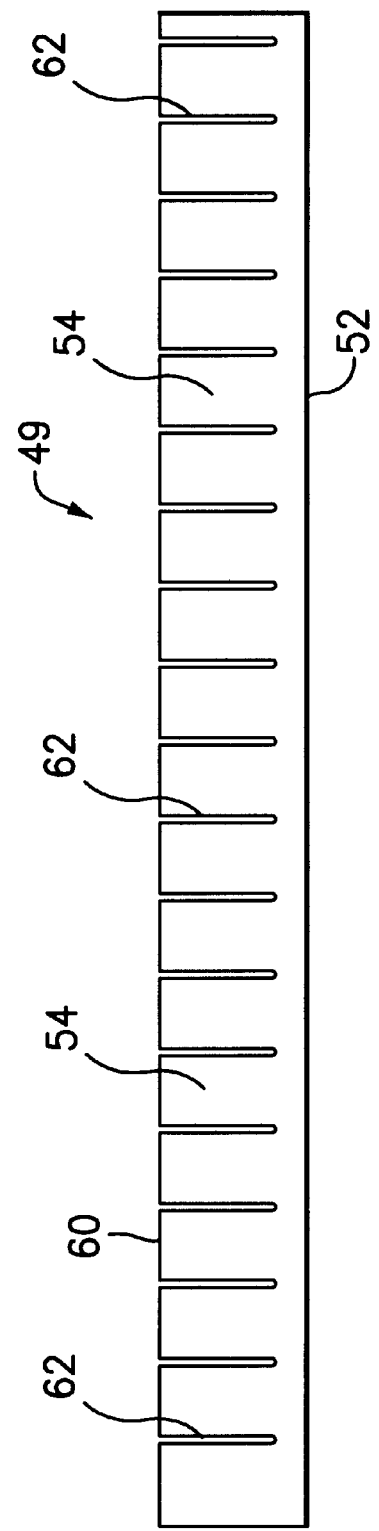
FIG. 7 is a front elevation of a single spring seal element in accordance with the invention.

Each flexible spring element 49 includes a horizontal mounting flange 52 and a substantially sideways S or Z-shaped section including compressive flex portions 54, 56 and 58, the latter terminating at a free sealing edge 60, remote from the flange 52. As best seen in FIGS. 5–7, each spring element 49 is slotted at spaced locations along its length, each slot 62 extending from the free sealing edge 60, through the compressive flex portions 54, 56 and 58 to, but not into, the mounting flange 52. It is contemplated that the transition piece seal as well as the spring elements, will be formed in two or more lengthwise segments to extend about the periphery of the transition piece aft end. Moreover, each segment will include a pair of spring elements 49, layered together but laterally offset, or shingled, so that the individual slots of one are closed by the solid flex portions between the slots of the other, as best seen in FIGS. 5 and 6.

In accordance with this invention, flexible spring seal elements 49 are added to interface between the transition piece seal 34 and the vertical forward face 50 of the stage 1 nozzle 51. In the exemplary embodiment, the spring seal elements are constructed of a Nickel based alloy, X-750.

Each flexible spring seal element 49 includes a horizontal mounting flange 52 and a substantially sideways S or Z-shaped section overlying the mounting flange 52 and including compressive flex portions 54, 56 and 58, the latter terminating at a free sealing edge 60, remote from the flange 52. As best seen in FIGS. 5–7, each spring seal element 49 is slotted at spaced locations along its length, each slot 62 extending from the free sealing edge 60, through the compressive flex portions 54, 56 and 58 to, but not into, the mounting flange 52. It is contemplated that the transition piece seal as well as the spring seal elements, will be formed in two or more lengthwise segments to extend about the periphery of the transition piece aft end. Moreover, each segment will include a pair of spring seal elements 49, layered together but laterally offset, or shingled, so that the individual slots of one are closed by the solid flex portions between the slots of the other, as best seen in FIGS. 5 and 6.

For example, if the slots 62 are spaced 1 inch apart, the cooperating spring elements would be laterally offset by about ½ inch. Thus, it will be understood that each spring seal element has a 1 inch flex portion at one end and a ½ inch flex portion at its opposite end (see FIG. 7) to enable the shingling arrangement at adjacent spring segment interfaces.

The spring seal elements 49 provide two separate sealing interfaces with the forward face 50 of the stage 1 nozzle 51. With reference to FIG. 4, with the mounting flanges 38 and 52 secured in the slot 66 with the aid of elongated shim 68, it can be seen that a first seal is established between the sealing edges 60 and the vertical forward face 50 of the stage 1 nozzle 51, and a second seal is established at the base 64 of the nozzle slot 66 as a result of downward pressure exerted on the transition piece seal mounting flange by the mounting flange 52 resulting from the compression of the spring seal elements against the forward face 50 of the nozzle 51.

The above arrangement further reduces combustion system leakage at the transition piece/nozzle interface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transition piece seal assembly adapted for sealing an interlace between a transition piece extending between a turbine combustor and a first stage turbine nozzle comprising:

a transition piece seal support having a first vertical flange for supporting a combustor transition piece seal adapted to be received in a peripheral slot in the transition piece, and a second horizontal flange adapted for mounting in an adjacent nozzle;

at least one spring seal element having a horizontal mounting flange adapted to overlie said second horizontal flange of said transition piece seal support for mounting in said nozzle, and a flex portion bent back over said horizontal mounting flange and having a free edge adapted to engage a forward face of said nozzle.

2. A transition piece seal assembly comprising:

a transition piece seal support having a first flange for supporting a transition piece seal, and a second flange adapted for mounting in an adjacent nozzle;

at least one spring seal element having a mounting flange adapted to engage said second flange of said transition piece seal support, and a flex portion having a free edge adapted to engage a forward face of said nozzle; wherein said at least one spring seal element is formed with a plurality of slots extending from the free edge of said flex portion to said mounting flange.

3. The assembly of claim 2 wherein said at least one spring seal element comprises a pair of spring seal elements arranged such that the slots of one are offset from the slots of the other.

4. The assembly of claim 1 wherein said flex portion is formed with a generally sideways Z-shape.

5. The assembly of claim 1 wherein said at least one spring seal element comprising a Nickel-based alloy.

6. A transition piece seal assembly comprising:

a transition piece seal support having a first flange for supporting a transition piece seal, and a second flange adapted for mounting in an adjacent nozzle;

at least one spring seal element having a mounting flange adapted to engage said second flange of said transition piece seal support, and a flex portion having a free edge adapted to engage a forward face of said nozzle;

wherein said transition piece seal includes a mesh cloth wrapped about one or more shims.

7. The assembly of claim 1 wherein said horizontal mounting flange is seated on said second horizontal flange of said transition piece seal support.

8. A gas turbine comprising an annular array of combustors, each having a transition piece extending between the combustor and a first stage turbine nozzle, and wherein a transition piece seal assembly is interposed at the interface of each transition piece and the first stage turbine nozzle, each transition piece seal assembly comprising:

a transition piece seal support having a first flange for supporting a transition piece seal, and a second flange secured in the first stage turbine nozzle; and at least one spring seal element having a mounting flange seated on said second flange of said transition piece seal support, and a flex portion having a free edge compressively engaged with a forward face of said nozzle.

9. The assembly of claim 8 wherein said at least one spring seal element is formed with a plurality of slots extending from said free edge of said flex portion to said mounting flange.

10. The assembly of claim 9 wherein said at least one spring seal element comprises a pair of spring seal elements arranged such that the slots of one are offset from the slots of the other.

11. The assembly of claim 8 wherein said flex portion is formed with a generally sideways Z-shape.

12. The assembly of claim 8 wherein said at least one spring seal element comprises a Nickel-based alloy.

13. The assembly of claim 8 wherein said transition piece seal includes a mesh cloth wrapped about one or more shims.

14. The assembly of claim 8 wherein said mounting flange is seated on said second flange of said transition piece seal support.

15. A method of reducing leakage at an interface of a transition piece and a first stage turbine nozzle, wherein the transition piece extends between a combustor and the first stage turbine nozzle, the method comprising:

a) providing a transition piece seal assembly between the transition piece and the first stage turbine nozzle wherein the transition piece seal assembly is supported on a forward face of the first stage turbine nozzle and includes a seal support supporting sealing media engaged in a peripheral slot or channel on the transition piece; and b) providing at least one additional seal element supported at one end in said forward face of said first stage turbine nozzle and having a free edge remote from said one end engaged with said forward face of said first stage nozzle, wherein said additional seal element comprises a mounting flange for supporting said additional seal element in said forward face of said first stage turbine nozzle, and a flex portion adapted to be compressed against said forward face.

16. The method of claim 15 wherein said additional sealing element is resiliently engaged with said forward face of said first stage turbine nozzle.

17. The method of claim 15 wherein said second seal element is formed with a plurality of slots extending from the free edge of said flex portion to said mounting flange.

18. The method of claim 17 wherein said at least one spring element comprises a pair of spring seal elements arranged such that the slots of one are offset from the slots of the other.

19. The method of claim 15 wherein said sealing media comprises mesh cloth wrapped about one or more shims.

* * * * *

UNITED STATES PATENT AND TRADEMARK OFFICE
CERTIFICATE OF CORRECTION

PATENT NO.    : 6,547,257 B2                                                Page 1 of 1
DATED         : April 15, 2003
INVENTOR(S)   : Cromer It is certified that error appears in the above-identified patent and that said Letters Patent is hereby corrected as shown below:

Delete Column 3, line 59 through Column 4, line 13.

Signed and Sealed this

Twelfth Day of August, 2003

JAMES E. ROGAN
*Director of the United States Patent and Trademark Office*